Nov. 12, 1963 W. V. MARBACH 3,110,058

SHIRRING MACHINE

Filed June 7, 1960 15 Sheets-Sheet 1

INVENTOR.
WALTER V. MARBACH

BY Richard S. Shreve Jr.

ATTORNEY

Nov. 12, 1963 W. V. MARBACH 3,110,058

SHIRRING MACHINE

Filed June 7, 1960 15 Sheets-Sheet 2

INVENTOR.
WALTER V. MARBACH
BY
Richard S. Shreve Jr.
ATTORNEY

INVENTOR.
WALTER V. MARBACH
BY
Richard S. Shreve Jr
ATTORNEY

Nov. 12, 1963 W. V. MARBACH 3,110,058

SHIRRING MACHINE

Filed June 7, 1960 15 Sheets-Sheet 4

INVENTOR.
WALTER V. MARBACH

BY Richard S. Shreve, Jr.

ATTORNEY

INVENTOR.
WALTER V. MARBACH
BY Richard S. Shreve, Jr.
ATTORNEY

Nov. 12, 1963 W. V. MARBACH 3,110,058

SHIRRING MACHINE

Filed June 7, 1960 15 Sheets-Sheet 6

INVENTOR.
WALTER V. MARBACH

BY

Richard S. Shreve, Jr.

ATTORNEY

Nov. 12, 1963 W. V. MARBACH 3,110,058

SHIRRING MACHINE

Filed June 7, 1960 15 Sheets-Sheet 7

INVENTOR.
WALTER V. MARBACH

BY
Richard S. Shreve, Jr.

ATTORNEY

Nov. 12, 1963 W. V. MARBACH 3,110,058

SHIRRING MACHINE

Filed June 7, 1960 15 Sheets-Sheet 8

INVENTOR.

WALTER V. MARBACH

BY

Richard S. Shreve Jr

ATTORNEY

INVENTOR.
WALTER V. MARBACH
BY
Richard S Shreve, Jr
ATTORNEY

INVENTOR.
WALTER V. MARBACH

BY Richard S. Shreve, Jr.

ATTORNEY

INVENTOR.
WALTER V. MARBACH
BY Richard S. Shreve Jr.
ATTORNEY

INVENTOR.
WALTER V. MARBACH
BY
Richard S. Shreve, Jr.
ATTORNEY

Nov. 12, 1963 W. V. MARBACH 3,110,058

SHIRRING MACHINE

Filed June 7, 1960

15 Sheets-Sheet 13

INVENTOR.
WALTER V. MARBACH
BY
Richard S. Shreve Jr.
ATTORNEY

Nov. 12, 1963 W. V. MARBACH 3,110,058

SHIRRING MACHINE

Filed June 7, 1960 15 Sheets-Sheet 14

INVENTOR.
WALTER V. MARBACH
BY Richard S. Shreve Jr.
ATTORNEY

INVENTOR.
WALTER V. MARBACH
BY Richard S. Shreve, Jr.
ATTORNEY

United States Patent Office 3,110,058
Patented Nov. 12, 1963

3,110,058
SHIRRING MACHINE

Walter V. Marbach, Palos Heights, Ill., assignor to Union Carbide Corporation, a corporation of New York Filed June 7, 1960, Ser. No. 34,413
10 Claims. (Cl. 17—42)

This invention relates to shirring machines for shirring tubing to form casings for sausage and the like.

Machine heretofore provided for shirring cellulosic tubing have required manual operation. The operator's hand grasped a shirred length of casing for deshirring a short terminal portion, tensioning said portion and severing the tensioned portion from the supply of unshirred casing, and transferring the severed shirred casing for compressing and doffing. These manual operations resulted in nonuniformity of the finished casings in length, or damage to pleats.

It is therefore the main object of the present invention to avoid the disadvantages of manual operation, and to provide an automatic controlled shirred casing length, compressed transfer, shirring machine for carrying out the desired operations for shirring sausage casings.

Other objects are to provide shirred and compressed cellulosic sausage casings of an exact casing length and with a maximum hole diameter, to automatically measure exact lengths of casings from a plurality of supply reels and sever them contiguous to the terminus of shirred casing; to automatically control the forward movement of loosely compressed casing leaving the shirring zone, the control means simultaneously, firmly compressing the adjacent previously shirred piece of tubing; to automatically separate cut pieces of casing shirred on a mandrel and transfer the advanced piece to and through a mandrel supporting clamp without deranging the shirred pleat pattern; to compress a shirred casing in a plurality of compression stages wherein at least one stage, the compression force is uniformly and gradually applied; to automatically and successively shirr a measured length of flattened cellulosic tubing to a shirred tube of a large hole size, firmly compress a preceding shirred tubing, tightly compress a preceding shirred tubing on a common mandrel, and restrain to prevent lengthwise expansion of a preceding shirred tubing or a doffing mandrel; and to provide an automatic shirring machine with components of each successive operating step of the cycle interlocked to interrupt the cycle, unless functioning safely.

It is a further object to apply the compressing force gradually to the axis of the loosely compressed shirred casing, and to maintain the casing under the final compression force for an extended time interval.

According to the present invention, sausage casings are manufactured by shirring a measured length of flattened cellulosic tubing on a mandrel as a first stage, severing the measured length from unshirred casing supply, applying axial force to the trailing end of said shirred length to advance it further along the mandrel and subject it to compression as a second stage and in a third stage tightly compressing the shirred casing by applying axial force to the trailing end of said advanced second stage length.

The casing is processed in three separate stages. In the shirring stage, the casing is condensed to about $\frac{1}{25}$th the original length. In the compressed stage, it is condensed to about $\frac{1}{50}$th the original length. In the tightly compressed stage, it is further compressed to about $\frac{1}{75}$th the original length, and then retained in compression until transferred to a doffing station.

The flattened tubing is passed from metering and feeding rolls onto a mandrel. The leading end of the shirring mandrel has a cylindroconical tip to assist in shirring startup at a supply reel change, and improve supply and distribution of the lubricated inflation air. The air supply is vented into the casing on the conical portion of the tip and thus is more effectively trapped by the casing upstream of the cylindrical portion of the tip. The air flows over the cylidnrical portion of the tip to assist in centering and advancing the casing; and downstream of the tip, is vented to the atmosphere through a central passage in the mandrel.

Two pairs of annular grooved rolls are arranged in tandem to provide central spaced passages intermediate the metering rolls and shirring passage, to align and support over 20 percent of the casing in the span between the metering rolls and the shirring passage. The tip of the mandrel is positioned intermediate the spaced alignment passages to ensure advancing the casing centrally on the mandrel at startup and to assist in threading up the casing at a reel change.

The new machine has an arrangement for momentarily increasing the pressure of casing inflating air from about 6 p.s.i. normally used to about 18 p.s.i. to stiffen and advance the inflated tubing thereby enabling the shirring means to effectively grip and pleat the casing at startup. The acceleration rate of the machine drive at startup of the shirring cycle is slowed down about 60 percent of normal acceleration rate to permit the open end of the casing to seal itself against the adjacent holdback surface before high speed shirring begins.

Lubrication of the cogs of the shirring rolls and interior of the cellulosic casing with a suitable lubricant is essential to facilitate shirring of the casing and to avoid abrasion damage thereto.

After a desired length of casing has been shirred, the feed rolls and the shirring action of the head are stopped. The head is then retracted from the shirred casing, thereby exposing unshirred casing for manipulation by a casing severing and transferring member.

To sever the unshirred casing exactly adjacent to the terminus of the shirred casing, the unshirred casing is encircled and gripped by a powered grip member immediately trailing the terminus of the shirring, then the gripping means are advanced on the mandrel to locally stress the casing between the gripping means and halted metering rolls and thereby sever the casing at the leading edge of the grip member.

To automatically transfer the severed shirred casing on the mandrel, from the shirring zone to and through spaced compression stations and a doffing station, tandem spaced gripping members which engage to encircle the mandrel, are affixed to a movable holdback arm which separates the severed trailing end of the previously shirred piece from the leading end of the casing next to be shirred. The spaced gripping members of the holdback arm initially control the advance of the pieces of shirred casings along the mandrel. Later in the cycle when the holdback arm has been completely advanced, a cooperating transfer arm is indexed between the spaced gripping members of the holdback arm. Thus, control of movement of the previously shirred piece of casing is transferred from the gripping members of the holdback arm to the gripping member of the transfer arm for successive indexing of the casing to spaced compressing and doffing stations.

The transfer arm and the partly-compressed casing are moved rapidly through a first mandrel clamp to a compressing station on the mandrel where auxiliary compressing power is transmitted to the transfer arm, to highly-compress the partly-compressed casing against the adjacent surface of a second clamp.

A doffing device is arranged with a separate mandrel aligned to receive the highly-compressed piece of casing advanced from the shirring mandrel. A separate retention means cooperates with the doffing mandrel, retaining the casing and preventing it from expanding beyond a specific length. An attendant may, by remote control, rotate the doffing unit out of alignment with the shirring mandrel; the compressed casing being then released from the retention means for removal to the shipping package.

Figure 14:
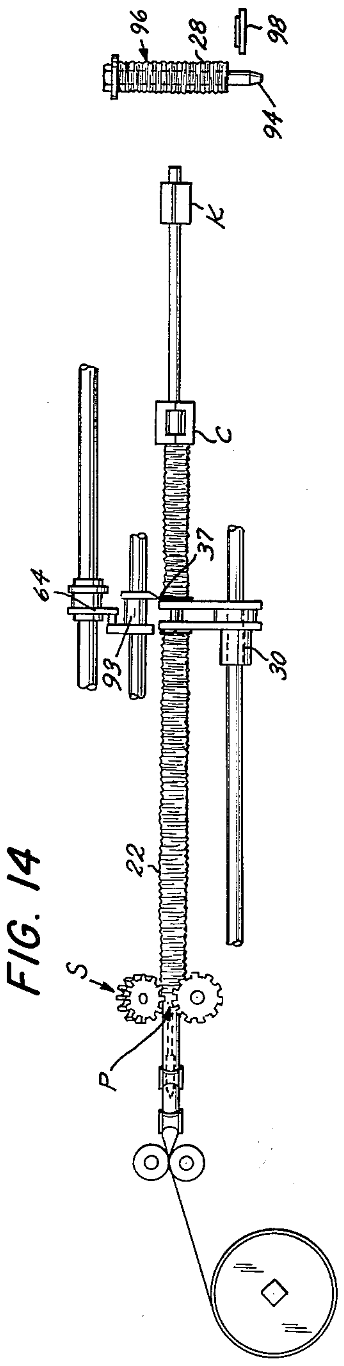
FIGURES 13, 14 and 15 are diagrammatic side elevations of components at successive stages of the shirring and compressing cycle.
Figure 13:
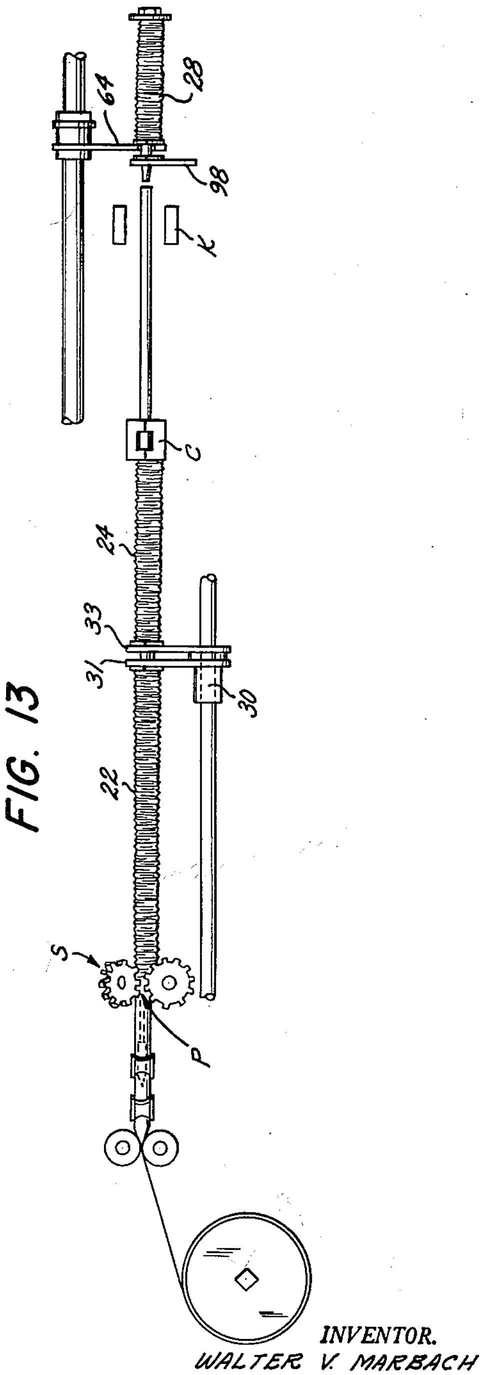
Figure 15:
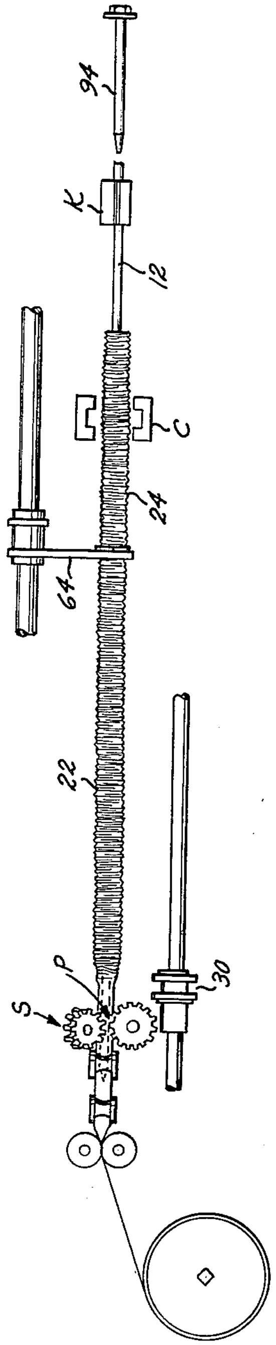
Figure 17:
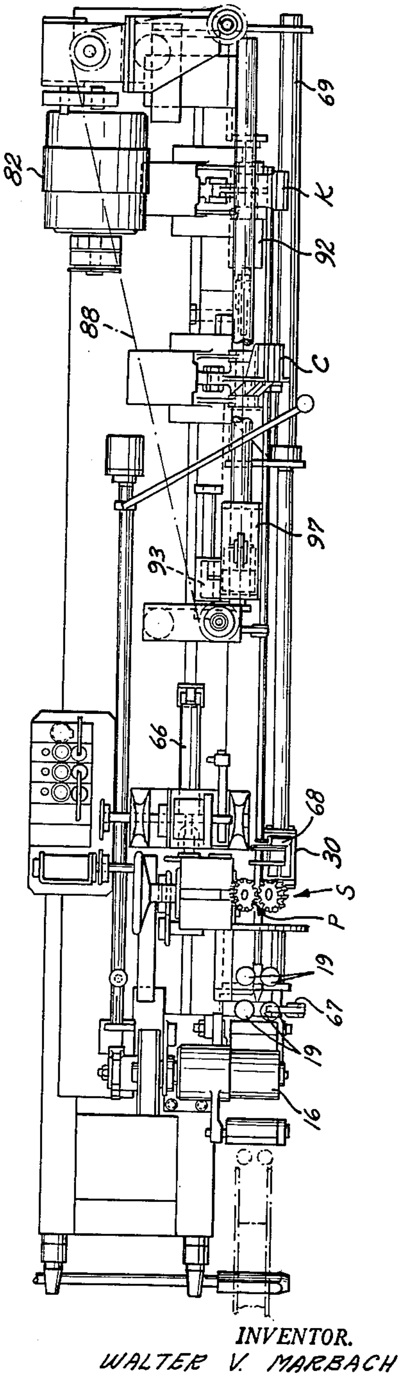
Figure 16:
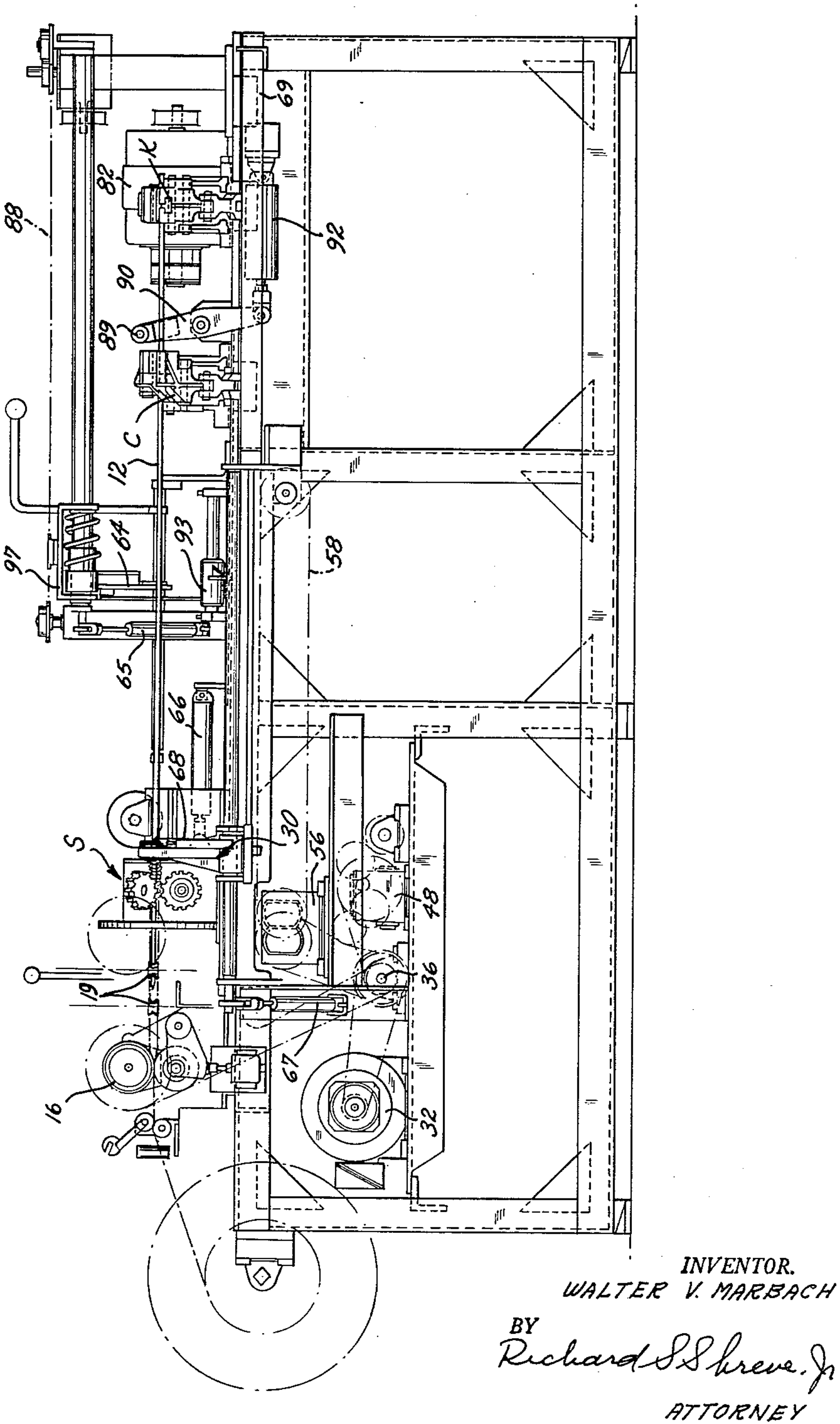
Figure 18:
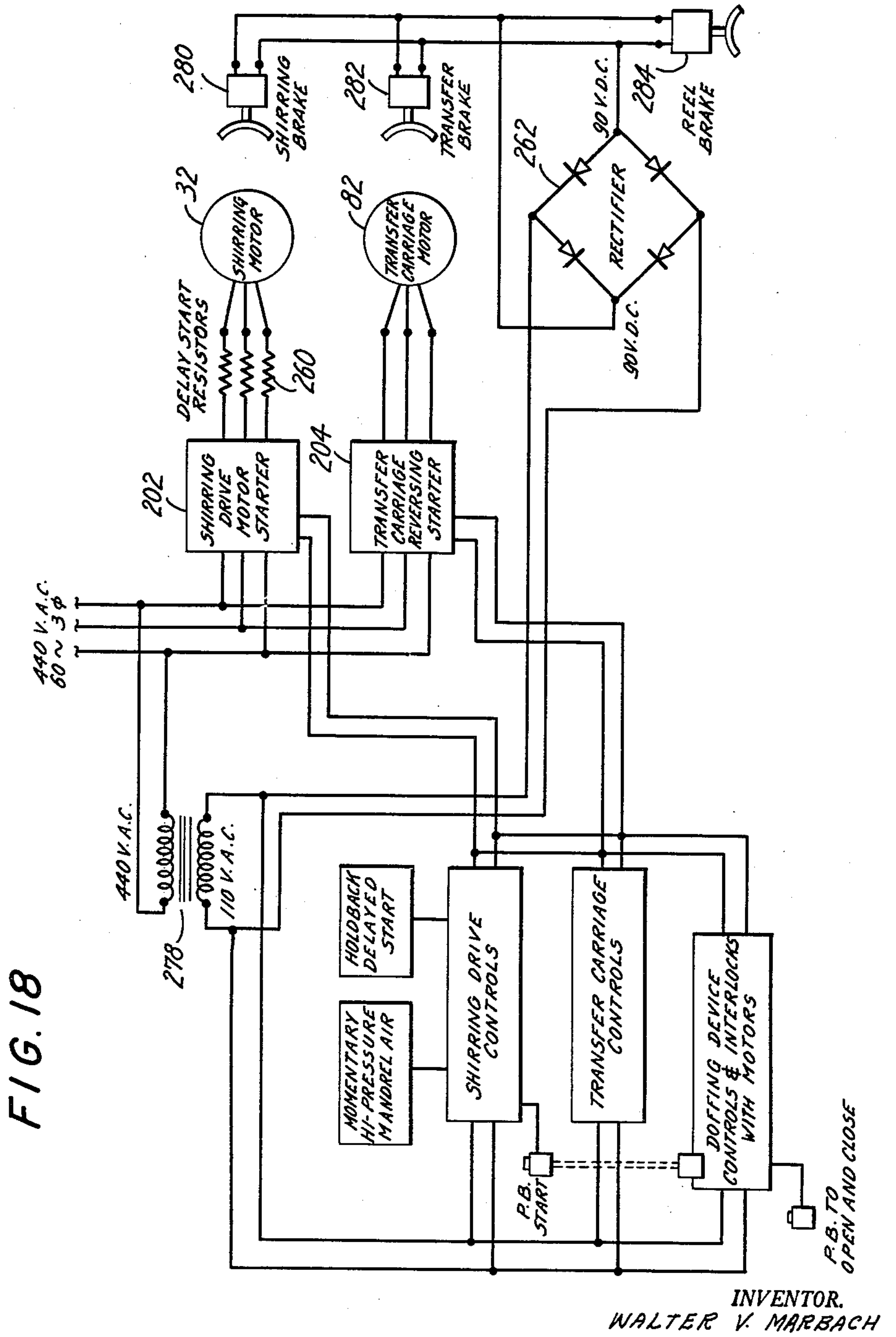
Figure 19:
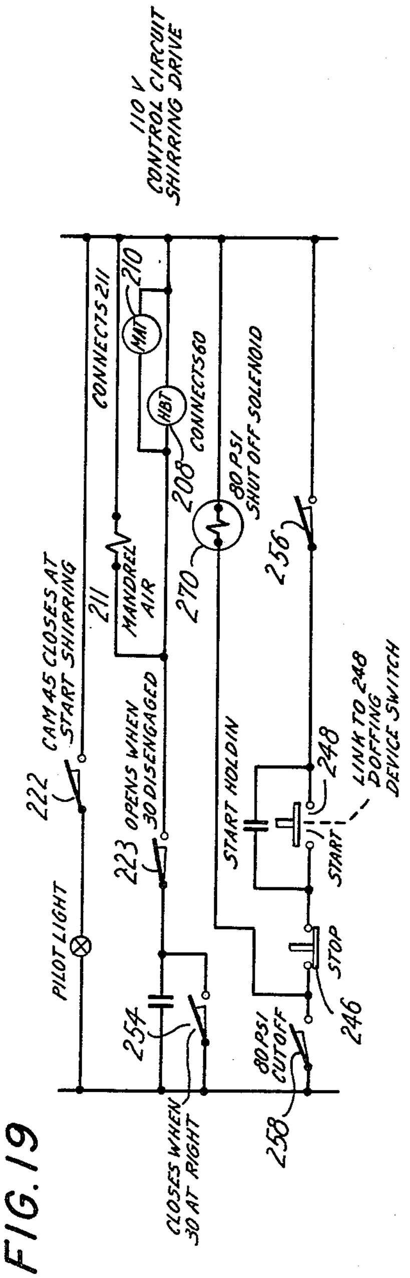
Figure 20:
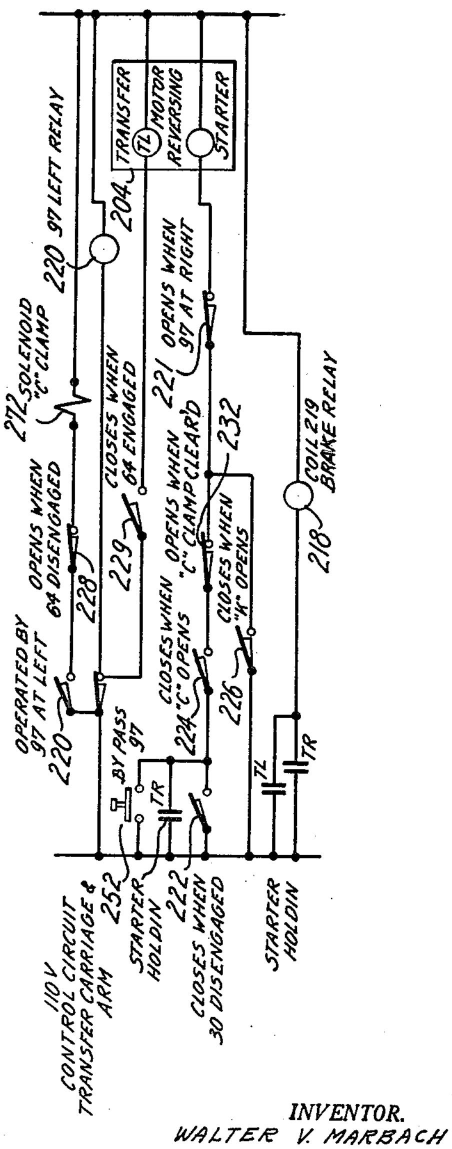
Figure 21:
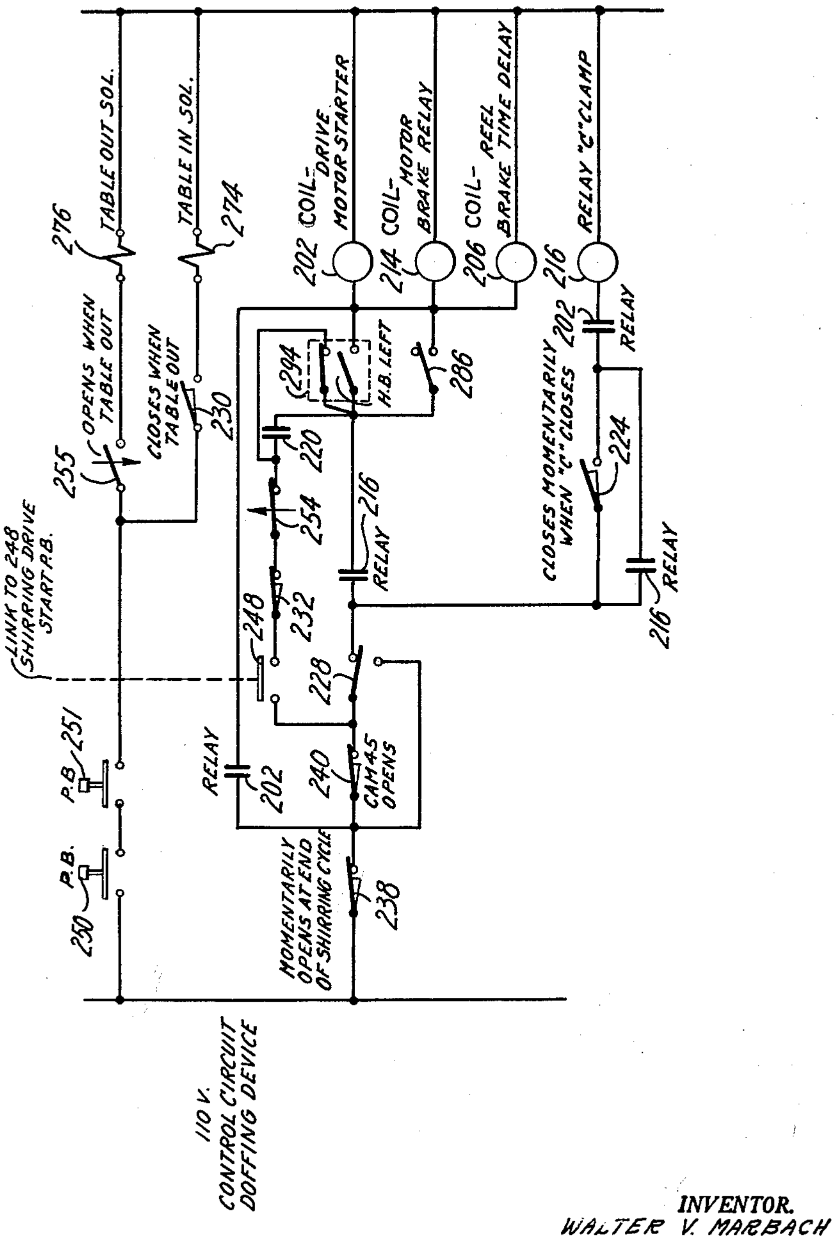
Figure 22:
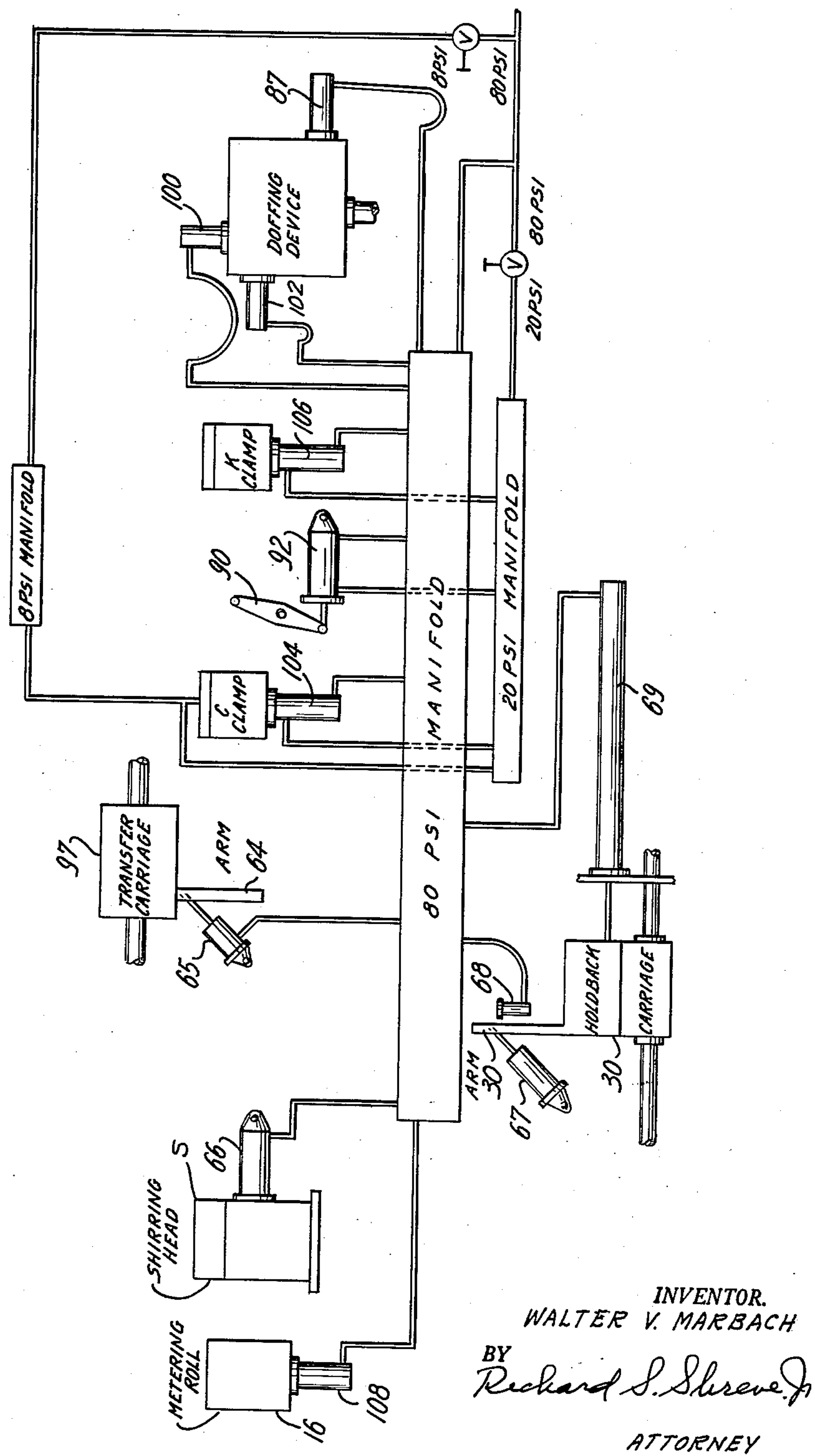
Figure 23:
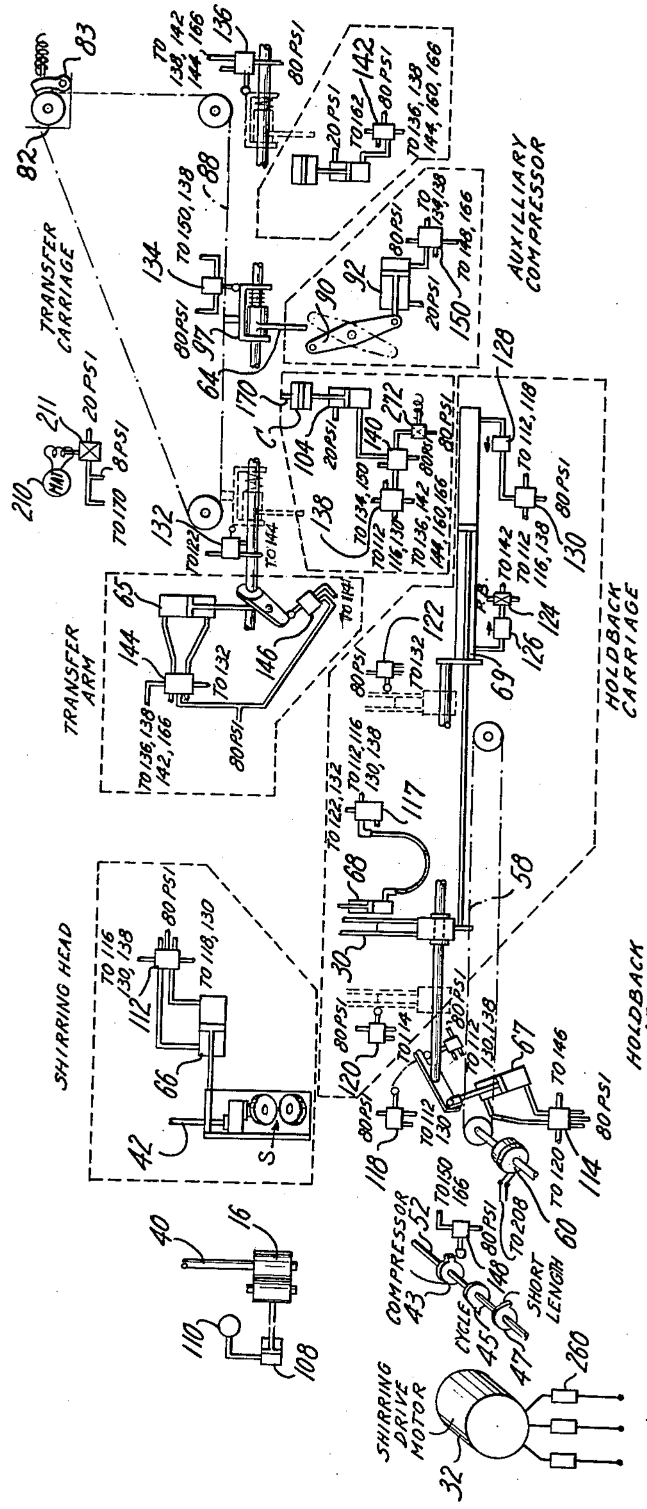
Figure 24:
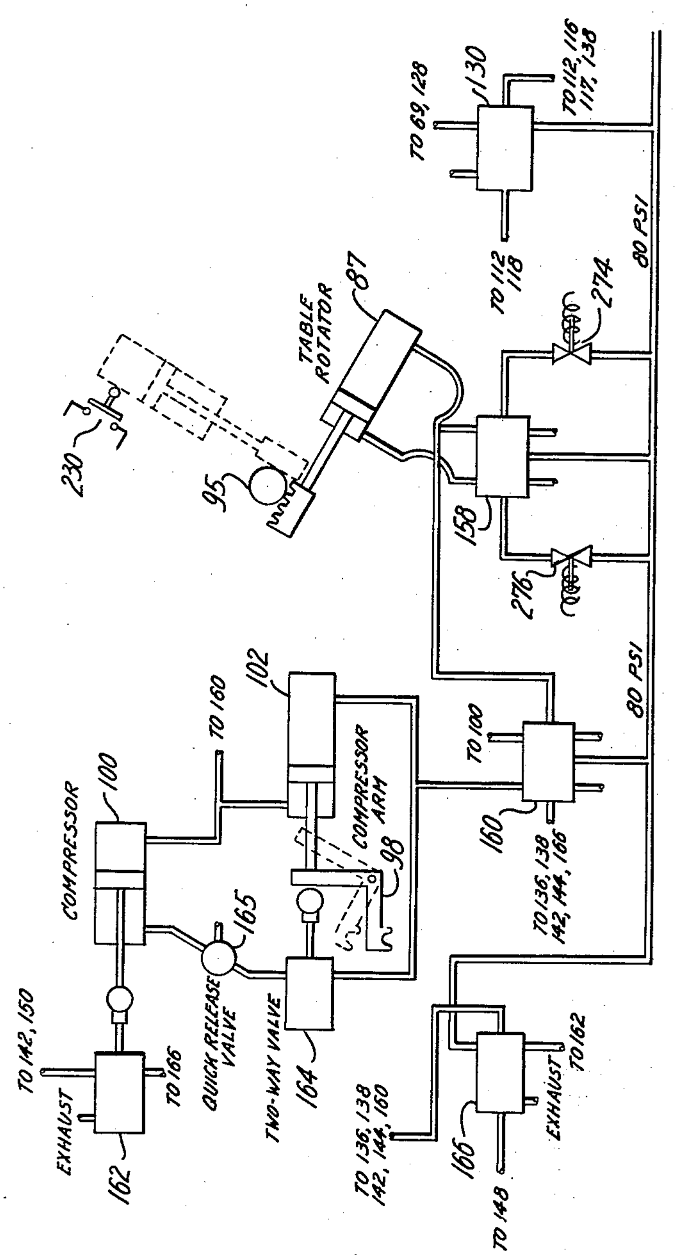

FIGURE 13 at 64 percent of the machine cycle;

FIGURE 14 at 80 percent of the machine cycle;

FIGURE 15 at 90 percent of the machine cycle;

FIGURE 16 is a side elevation of a general assembly of the machine;

FIGURE 17 is a plan of the machine shown in FIGURE 16;

FIGURE 18 illustrates, in block diagram, the electrical circuits which can be employed for the automatic shirring machine shown in the preceding figures of the drawings;

FIGURE 19 illustrates diagrammatically the electrical circuits for controlling the shirring motor and associated operations shown in FIGURE 18;

FIGURE 20 illustrates diagrammatically the electrical circuits for controlling the transfer carriage motor and associated operations shown in FIGURE 18;

FIGURE 21 illustrates diagrammatically the electrical circuits for controlling the doffing device and associated interlocks with the motor controls of FIGURES 19, 20;

FIGURE 22 illustrates, in block diagram, the pneumatic circuits which can be employed for the automatic shirring machine shown in the preceding figures of the drawings;

FIGURE 23 illustrates diagrammatically the pneumatic circuits for controlling the shirring head, holdback carriage, transfer carriage and auxiliary compressor shown in FIGURE 22; and FIGURE 24 illustrates diagrammatically the pneumatic circuits for controlling the doffing device shown in FIGURE 22.

Figure 1:
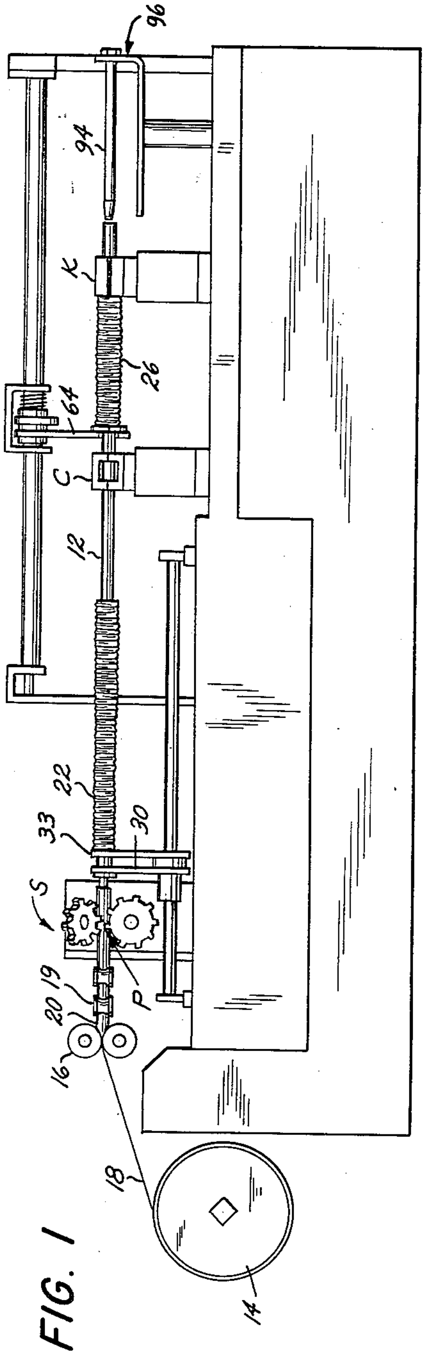
FIGURE 1 is a diagrammatic side elevation of a shirring apparatus, showing the preferred embodiment of the present invention.
Figure 2:
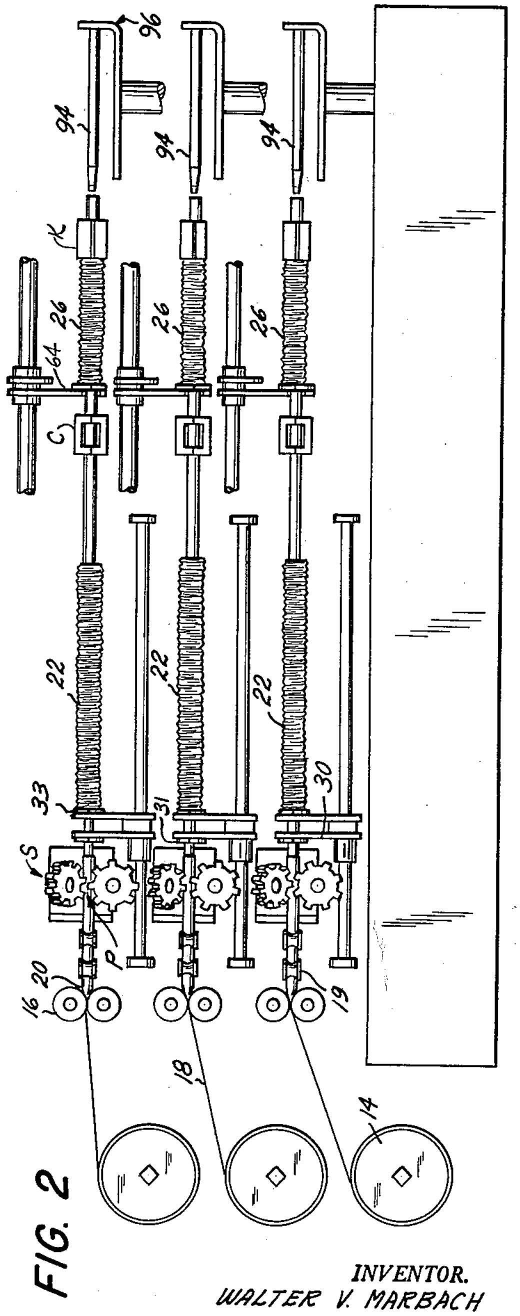
FIGURE 2 is a diagrammatic side elevation of a modified three-mandrel shirring apparatus.

As shown in FIGURE 1, a supply of flattened tubing, such as cellulosic tubing 18, is intermittently withdrawn from a supply reel 14 in measured lengths, such as 40 ft., 44 ft. and 55 ft. by a pair of horizontally journaled metering rolls 16. The flattened tubing 18 is advanced through metering rolls 16, expanded to inflated tubing 20 as by gaseous means, and by means of a plurality of pairs of annular grooved rolls 19 is aligned centrally onto hollow mandrel 12 to and through zone of shirring S.

Figure 6:
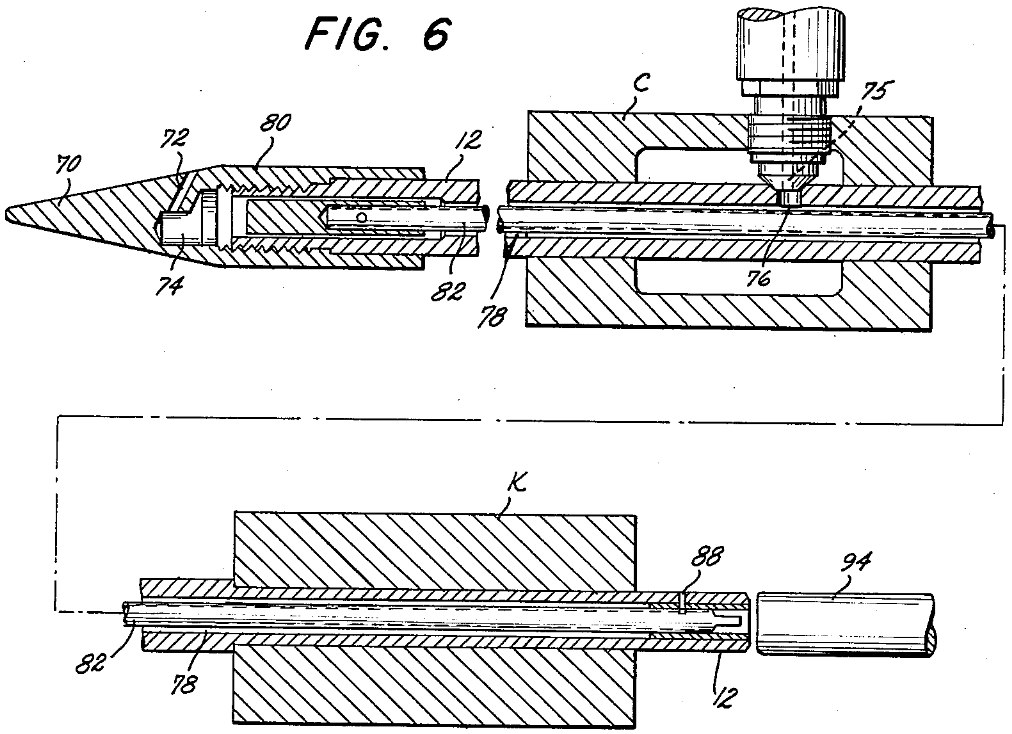
FIGURE 6 is an axial sectional view of portions of the shirring mandrel gripped in the shirring machine clamps.
Figure 7:
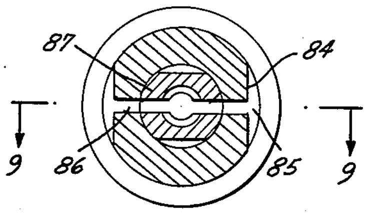
FIGURE 7 is an enlarged sectional view of shirring mandrel 12 along line 7—7 of FIGURE 8.
Figures 8, 9:
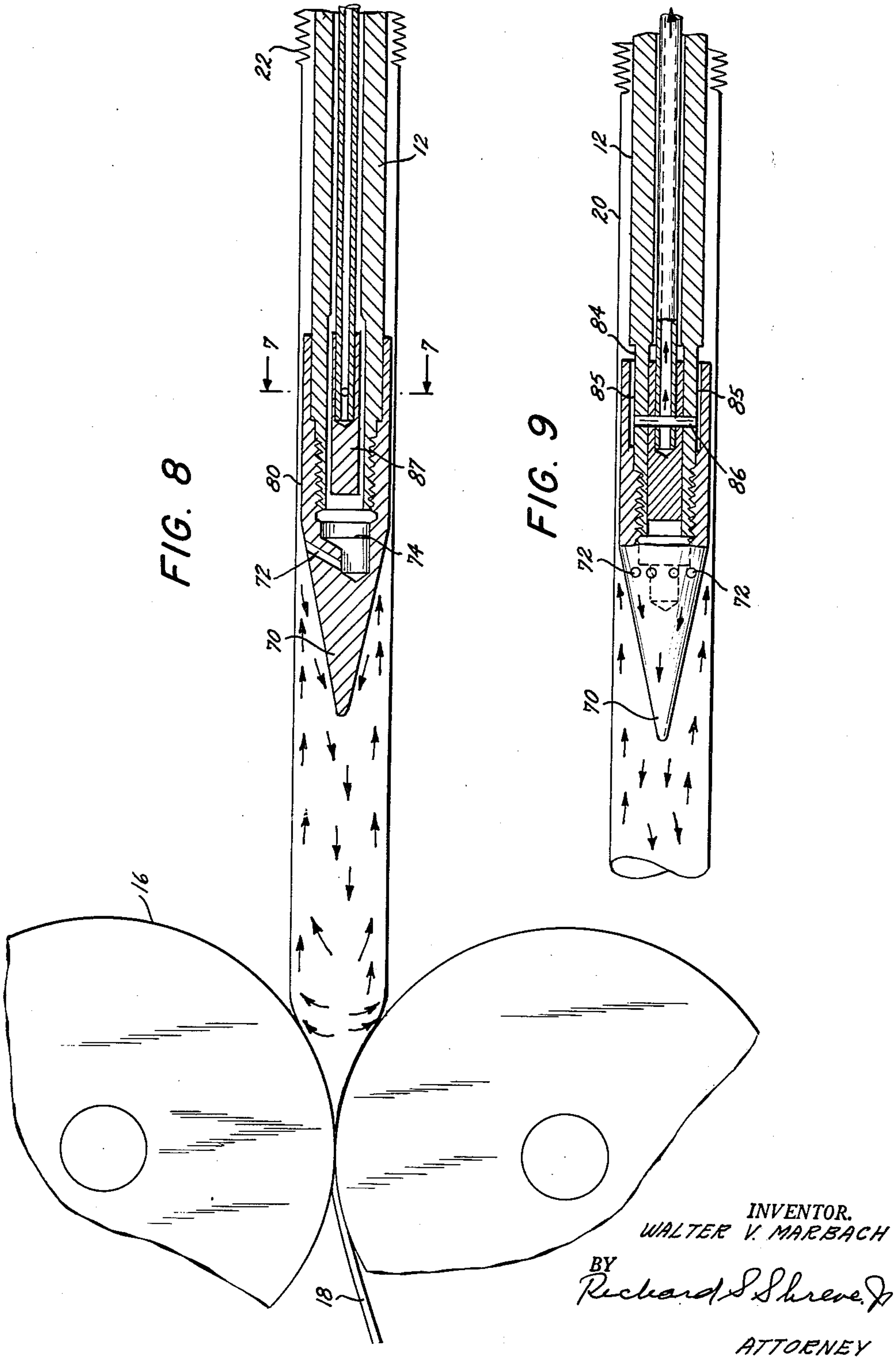
FIGURE 8 is a transverse section of the entry end of the shirring mandrel.
FIGURE 9 is a top sectional view of shirring mandrel 12 taken along line 9—9 of FIGURE 7.
Figure 10:
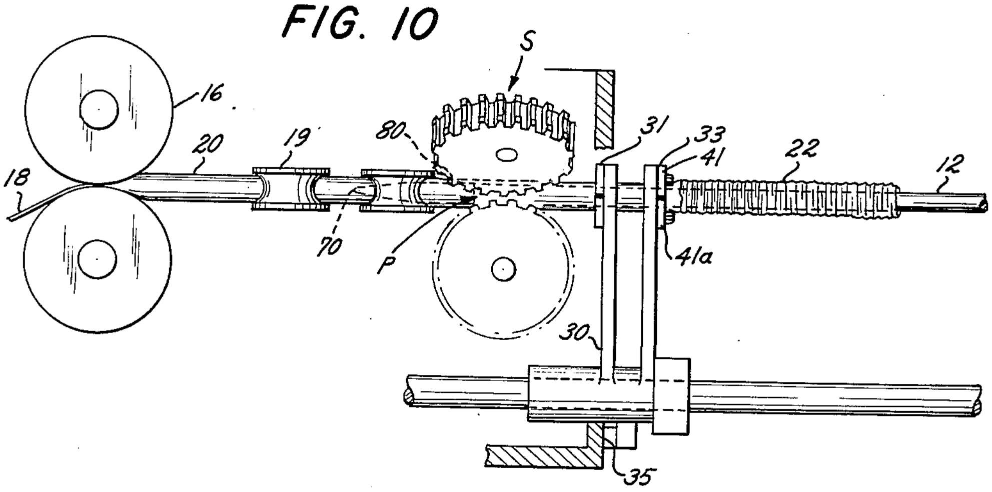
FIGURE 10 is an enlarged diagrammatic side elevation of the shirring head and holdback arm in retracted position and unshirred casing exposed.
Figure 12:
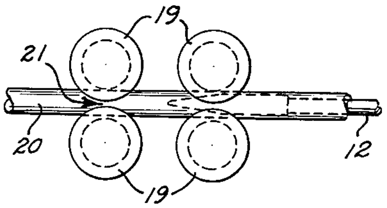
FIGURE 12 is a diagrammatic plan of a portion of FIGURE 11.

The leading end of the mandrel 12 has cylindroconical tip 70 (FIG. 6) positioned at about 55 percent the distance from shirring passage P to the nip of metering rolls 16. Two pairs of annular grooved rolls 19, as more particularly shown in FIGURE 12, are arranged in tandem to provide spaced circular passages 21 which support the casing around its circumference and align it central to mandrel 12. The passages formed by the pairs of annular grooved rolls 19, as more particularly shown in FIGURE 10, are spaced to grip and support about 20 percent of the casing span intermediate the metering rolls 16 and the shirring passage P. Circular passages 21 thus prevent the wandering of casing caused by telescoped or non-flat supply reels of casing.

Optimum guidance for casing 20 onto mandrel 12, as more particularly shown in FIGURES 6, 7, 8 and 9, is provided by making cylindrical portion 80 of the tip of a diameter at least 0.020 inch less than the minimum inside diameter of inflated casing 20. Tip 70 of mandrel 12 supplies the gaseous inflating means to casing 20 through a plurality of holes 72 bored in the upper portion of the cone and connected to internal chamber 74. The gaseous means which, for example, may be air under pressure of about 6 p.s.i. during shirring, is momentarily increased to a pressure of about 18 p.s.i. at the start of the shirring when metering rolls 16 start advancing casing 18 to inflate, stiffen and advance the leading open end of unshirred inflated casing 20 to the adjacent surface of holdback arm 31 whereby the air is sealed into the casing and pleating of the casing is started. The momentary increase in mandrel air pressure at the start of the shirring cycle is accomplished by actuating an electrical time-delay relay 210 as shown on FIGURE 19, which operatively connects valve 211 as shown on FIGURE 23, thereby connecting the normal 8 p.s.i. of mandrel air supply to a source of 20 p.s.i. air.

Air is supplied from any convenient source to bore 78 of mandrel 12, as by internal passage 75 through clamp C communicating with bore 78 through radial opening 76 in the mandrel wall. The air is led to chamber 74 and by holes 72 to inflate casing 20. An oversupply of lubricated air is provided to lubricate the mandrel. The circulating air advances along the cylindrical portion 80 of the tip and is additionally used to center and advance casing 20 to the shirring passage P. The oversupply of air is vented to an interior tube 82 central of mandrel bore 78, by means of passage 85 made by flats 84 on mandrel 12 and by radial holes 86 bored through the mandrel and plug 87. The air then advances along tube 82 to an exit orifice 88 positioned in advance of clamp K.

Figure 4:
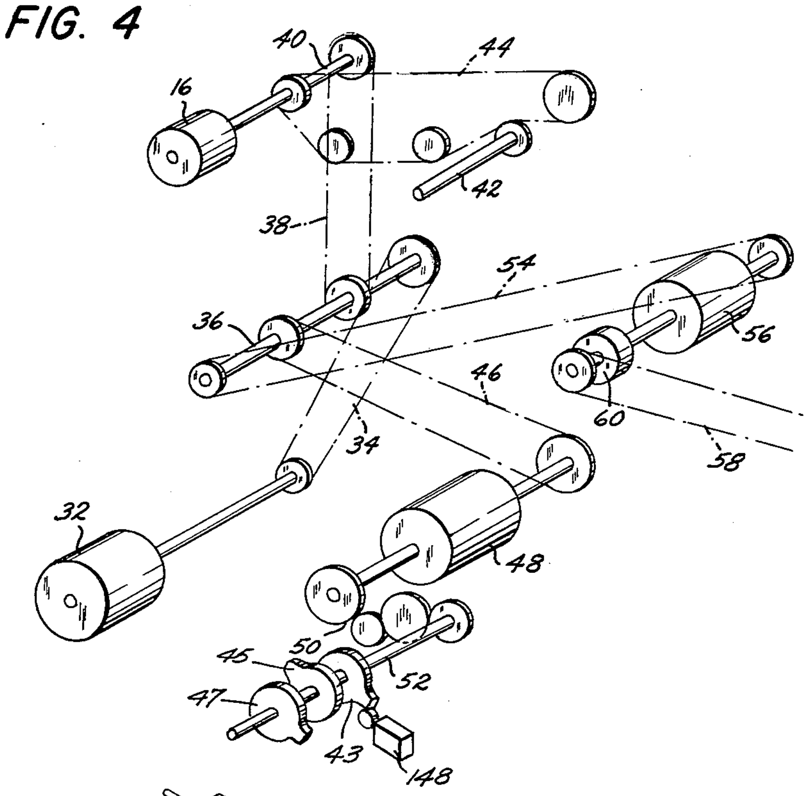
FIGURE 4 is a perspective of the principal drive elements.

Referring now to FIGURE 4 and to the electrical block diagram FIGURE 18, main drive motor 32 is intermittently operated during each shirring cycle by the control circuit shown on FIGURE 19 to drive jackshaft 36 to timing belt drive 34. Acceleration of motor 32 is delayed at the start of each shirring cycle by delay start resistors 260. A delay of at least two seconds for the motor to reach full speed, enables the means described above to advance the leading end of casing 20 to and through the shirring passage P and seal it against the holdback surface 31 without jamming the casing on mandrel 12.

Jackshaft 36 drives metering rolls 16 through timing belt drive 38 and shaft 40. Shaft 40, in turn, drives shirring head drive 42 through chain drive 44. Jackshaft 36 also drives cam shaft 52 through timing belt drive 46 and speed reducer 48 and change gear train 50. Cam shaft 52 makes one revolution per machine cycle. The length of casing drawn into each machine cycle by metering rolls 16 is adjusted by changing the ratio of the drives between metering rolls 16 and cam shaft 52. Referring now to FIGURE 23, cam shaft 52 mounts the cycle cam 45, short length cam 47 and auxiliary compressor cam 43. Cycle cam 45 determines length of casing shirred, by halting shirring motor 32 when a predetermined length has been advanced through the metering rolls. Short length cam 47 permits declutching of the shirring head and metering rolls 16 to finish out a cycle when a splice, or short length in the casing supply occurs. Compression cam 43 operates to trip compressor cam pilot valve 148 which actuates doffing device interlock valve 166 (FIGURE 24), which in turn, actuates valve 142 to operate pneumatic cylinder 106 opening clamp "K," and also actuates valve 150 to operate pneumatic cylinder 92 thereby retracting compressor arm 90. This operation predetermines the length of time casing 26 is under high compression.

Jackshaft 36 also drives the holdback arm 30 (FIGURE 3) through timing belt drive 54, speed reducer 56 and chain drive 58; thus controlling the advance of shirred casing 22 from the zone of shirring S. At termination of the shirring cycle, electrically operated clutch 60 is de-energized which thereby disconnects holdback chain drive 58 from reducer 56, thus permitting holdback arm 30 to be returned by air cylinder 69 to zone of shirring S. At start of the shirring cycle, electrical time delay relay 208 (FIGURE 19) holds the circuit open momentarily, and thus clutch 60 is not immediately operatively connected to the holdback chain drive 58. This delay momentarily halts movement of the holdback arm 30 and allows an amount of the casing at startup to be shirred against holdback fork 31 to a shirred density approximately that of the remainder of the shirred length of casing.

Figure 3:
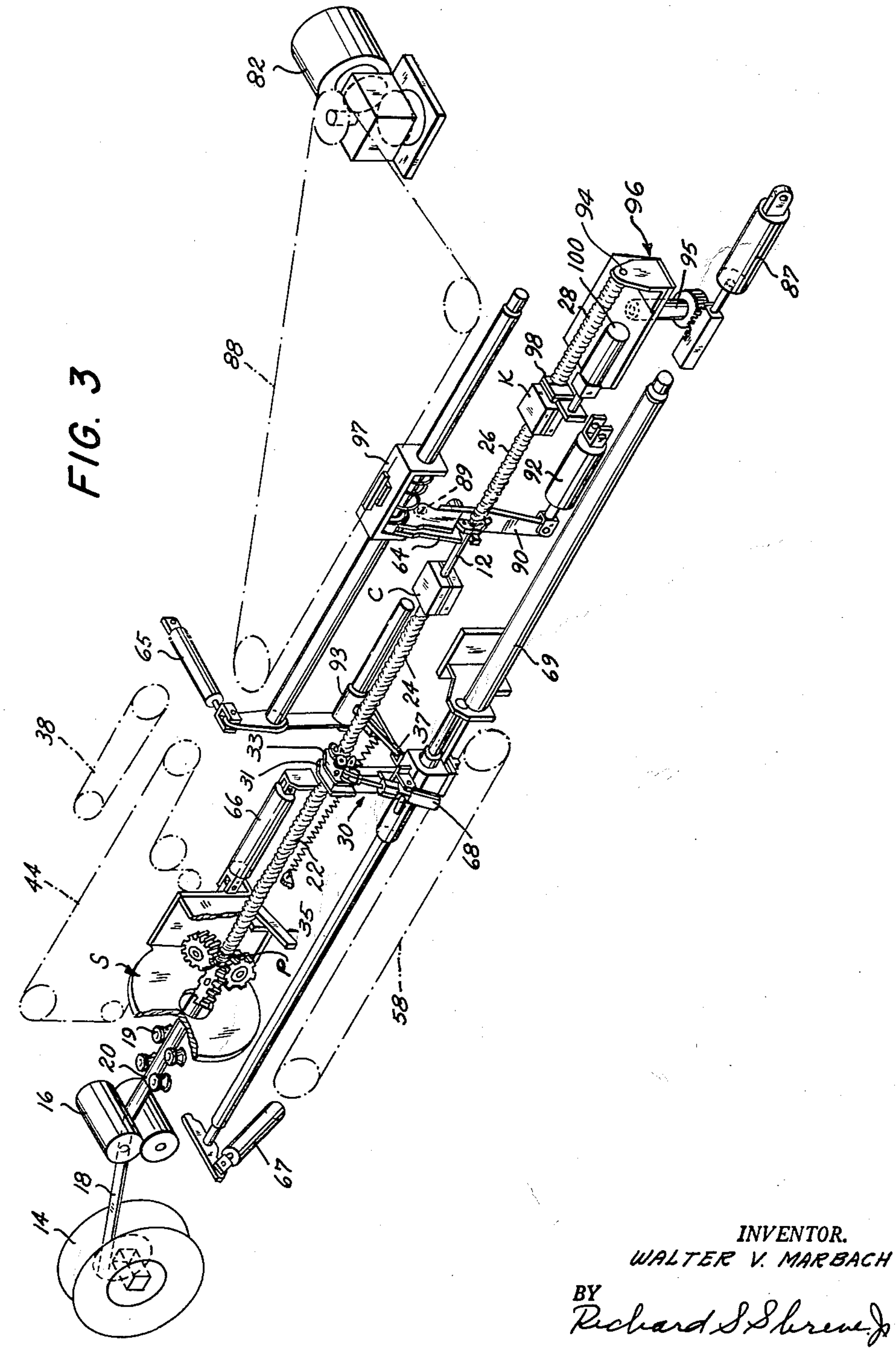
FIGURE 3 is a perspective of the upper portion of a shirring apparatus shown in FIGURE 1 and showing a mandrel positioned in a central passage of the shirring means.

As shown in FIGURE 3, the desired length of inflated casing is loosely shirred by a suitable shirring means S, (including those described in copending Matecki application Serial No. 744,444 and Patent Nos. 2,983,949 and 2,984,574 against the forked surface 31 on cooperatively yielding holdback arm 30. Referring now to FIGURE 10, holdback arm 30 has a holdback fork 31 and powered gripping jaws 33 forming tandem spaced surfaces, each of which encircle and grip the mandrel and separate the loosely shirred casing 22 from firmly-compressed casing 24 previously shirred. The gripping jaws on fork 31 are pivoted and spring-loaded to the closed position. Initial engagement of the gripping jaws with the mandrel spreads the jaws and then the spring action causes them to encircle and grip the mandrel. Shortly after the shirring means starts to operate, the holdback arm 30 is advanced at a specific rate by holdback chain drive 58. This restricts the advance of the loosely shirred casing 22 from the zone of shirring S; provides about a 1/25th length reduction in the casing and firmly-compresses previously shirred casing 24 against the adjacent surface of clamp "C."

During the shirring operation, holdback arm 30 is advanced by chain drive 58 to control the shirred density of casing stick 22 and partly-compressed stick 24. When the desired length of casing, such as 55 ft., has been pleated as loosely shirred casing 22, cycle cam 45 opens cycle stop switch 238 (FIGURE 21), thereby de-energizing shirring drive starter 202, motor 32 and energizing brake 280 through motor brake relay 214.

Referring particularly to FIGURE 23, when shirring stops, holdback arm 30 has been advanced fully to engage pneumatic valve 122 which triggers a sequence of interlocked pneumatically controlled operations. Transfer arm 64 has been previously retracted and indexed as later described, opposite holdback arm 30.

When both holdback right pilot valve 122 and transfer device left pilot valve 132 have been actuated, valve 144 operates pneumatic cylinder 65 to swing transfer arm 64 into engagement with mandrel 12, between spaced surfaces 31 and 33 of the holdback arm 30. Cycle limit switch 238 causes solenoid operated valve 272 to close, thereby venting 80 p.s.i. air from pneumatic cylinder 104 and thus causing "C" clamp to open. This occurs only when "left" limit switch 220 has been actuated by contact of transfer carriage 97, and transfer arm 64 has engaged "arm-in" valve 146. Actuation of transfer "arm-in" valve 146 actuates holdback arm valve 114 to operate pneumatic cylinder 67, thereby causing holdback arm 30 to disengage from mandrel 12.

When transfer arm 64 is engaged with mandrel 12 and pneumatic cylinder 67 swings holdback arm 30 out of engagement with the mandrel, the trailing end of casing 24 is transferred to the leading surface of transfer arm 64. The leading surface of arm 64 mounts gripping members which are spring-loaded to be held open when not engaged by the mandrel, and are thus arranged always to accept mandrel 12 at engagement.

Actuation of holdback of holdback "arm-out" pilot valve 118 (FIG. 23) and limit switch 222 (FIGURE 20), which closes when holdback arm 30 disengages the mandrel thereby causes; pilot valve 112 to operate pneumatic cylinder 66 thereby retracting shirring head S; pilot valve 130 to actuate valve 128 to operate pneumatic cylinder 69 thereby retracting holdback arm 30 to the left to contact pilot valve 120; transfer motor 82 and drive 88 to advance transfer carriage 97 to the right, if "C" clamp limit switch 224 is closed and "C clamp-cleared" switch 232 is opened.

When holdback left pilot valve 120 is actuated by holdback arm 30 reaching its retracted, leftmost position, it actuates valve 114 to operate pneumatic cylinder 67 to swing holdback arm 30 into engagement with mandrel 12; which in turn, actuates holdback "arm-in" pilot valve 116. When valve 116 is actuated it causes valve 112 to operate pneumatic cylinder 66 advancing shirring head S to the right, thereby contacting at 35 and advancing holdback arm 30 and exhausting holdback cylinder 69; and "C" clamp pilot valve 138 to actuate valve 140 and operate pneumatic cylinder 104 to close clamp "C," if transfer carriage 97 has tripped "C clamp-cleared" pilot valve 134.

Shirring head S is arranged to be advanced and retracted parallel to mandrel 12. In the retracted position, the shirring head is disengaged from the terminus of the shirred casing, thereby enabling pneumatic cylinder 67 to swing the holdback arm 30 into engagement with mandrel 12 behind the said terminus. The advanced gripping member 33 of holdback arm 30 is comprised of pivoted plate jaws 41, 41*a*, mounting mating gear segments which are actuated by pneumatic cylinder 68. Upon engagement with mandrel 12, the gripping jaws 41, 41*a* firmly encircle and grip casing 20, thus segregating the loosely shirred portion 22 from unshirred casing 20. The holdback "arm-in" pilot valve 116 actuates valve 117 which operates pneumatic cylinder 68 to close the pivoted gripping jaws 33 firmly about mandrel 12.

Figure 11:
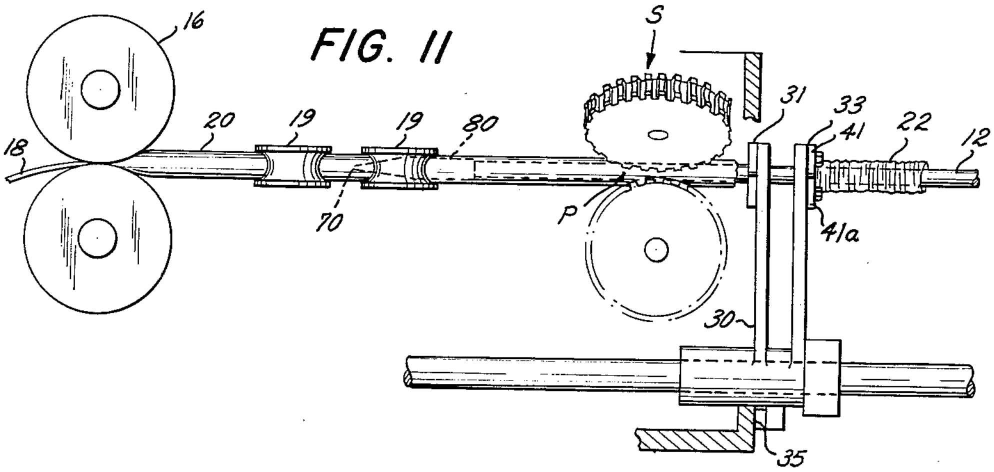
FIGURE 11 is an enlarged diagrammatic side elevation of the shirring head in advance position, and the unshirred casing severed.

Continuing in the sequence of electro-pneumatic operations described above, and referring also to FIGURE 11, holdback arm 30 is advanced by the shirring head S to a position in advance of the shirring passage P. The advanced gripping member 33 of holdback arm 30 grips the encircled portion of unshirred casing 20 and advances and thereby tensions the casing between the gripping means and the halted metering rolls 16. This severs the casing at the leading edge of the grip 33, thereby separating the metered shirred length 22 from unshirred casing 20.

Meanwhile, in the sequence of operations described above and referring again to FIGURE 3, clamp "C" has been opened whereupon the transfer arm 64 and casing 24 are advanced along mandrel 12 to and through clamp "C" by chain drive 88 operated by motor 82. Clamp "C" is closed by transfer carriage 97 actuating pilot valve 134 (FIGURE 23) and another shirring cycle is started by the following controls. When clamp "C" is closed, it trips limit switch 224 (FIGURE 20) which causes the shirring cycle to start if holdback arm 30 is in start position sensed by limit switch 294 (FIGURE 21); and causes time delay relay 208 (FIGURE 19) controlling clutch 60 to start functioning.

As transfer carriage 97 advances arm 64 on mandrel 12, it trips "C clamp-cleared" pilot valve 134 and "clamp-cleared" switch 232 which causes transfer carriage motor starter 204 to be de-energized and motor 82 to be stopped by energizing brake 282; actuates "C" clamp interlock valve 138 to actuate valve 140 operating pneumatic cylinder 104 to close "C" clamp; actuates compressor valve 150 operating pneumatic cylinder 92 to cause compressor arm 90 to engage transfer arm 64 thereby to tightly compress casing stick 26 against the adjacent surface of closed clamp "K."

After the machine has gone through about 60 percent of the complete operation cycle, compressor cam 43 actuates the control sequence noted above, which retracts compressor arm 90 from contact with transfer arm 64, and opens clamp "K." When clamp "K" opens, switch 226 energizes starter 204 in advancing direction and de-energizes brake 282 and causes motor 82 to advance transfer carriage 97 to and through clamp "K." Transfer arm 64 thereby pushes tightly-compressed casing 28 from the advance end of the mandrel 12 onto doffing mandrel 94 (FIGURE 5) of rotatably mounted doffing unit 96 which, during this operation, is aligned with shirring mandrel 12.

When transfer carriage 97 reaches its rightmost position, it contacts pilot valve 136 and right limit switch 221 which causes; transfer carriage motor starter 204 to be de-energized and motor 82 to be stopped by energizing brake 282; actuates valve 144 operating pneumatic cylinder 65 to disengage transfer arm 64 from the mandrel 12 and out of contact with pilot valve 146; actuates valve 142 operating pneumatic cylinder 106 to close clamp "K"; exhaust doffing device interlock valve 166 (FIGURE 24) and "C" clamp interlock valve 138.

When transfer arm 64 disengages mandrel 12, it actuates "arm-out" limit switch 222 which causes; transfer carriage motor starter 204 to be energized in retracting direction, de-energizes brake 282 thereby causing motor 82 to retract transfer carriage 97 to the leftmost position, actuating "left" limit switch 220 and pilot valve 132. This, in turn, causes transfer carriage drive to become de-energized by limit switch 220 and at this station, transfer arm 64 is indexed with advancing holdback arm 30. Transfer arm 64 is slidably engaged with spring-loaded carriage 97 by coil spring 99 which yields when carriage 97 is retracted beyond the indexing position where transfer arm 64 engages indexing carriage 93. Indexing carriage 93 has previously been advanced to the indexing position by contact at 37 with advanced holdback arm 30. This indexing action aligns the retracting transfer arm 64 with advancing holdback arm 30 and thus, in the control sequence already described, permits transfer arm 64 to swing into engagement with mandrel 12 intermediate the spaced surfaces of advancing holdback arm 30 also engaged with mandrel 12. Transfer arm 64 engages mandrel 12 immediately after the shirring cycle has been completed.

Operations of the rotatably mounted doffing unit 96 are electro-pneumatically interlocked with the shirring, compressing operations by control circuits shown on FIGURES 21, 24. When, as described above, transfer arm 64 has advanced to its rightmost position and thereby advancing a fully compressed casing stick 28 onto doffing mandrel 94, it contacts pilot valve 136 which, in turn, actuates doffing device interlock valve 166. Actuation of valve 166 in turn actuates valve 144 which disengages transfer arm 64 from mandrel 94. At the same time, valve 166 actuates valve 160 which operates pneumatic cylinder 102, swinging compressor arm 98 into engagement with doffing mandrel 94. As compressor arm 98 swings into engagement with mandrel 94, it actuates normally closed two-way valve 164 which causes; pneumatic cylinder 100 to advance compressor arm 98 to compress the stick 28, preventing it from expanding in length.

Casing stick 28 can be removed after the operator simultaneously actuates both spaced push buttons 250, 251. This operation opens solenoid valve 276, actuating valve 158 to operate pneumatic cylinder 87 which is attached to a gear rack, and engages a gear on shaft 95 thereby rotating the entire doffing device out of alignment with mandrel 12. Valve 158 also actuates valve 160 which reverses the air at pneumatic cylinders 100 and 102, thereby retracts and disengages compressor arm 98, and thus casing stick 28 may then be removed.

The operator can return the doffing device into alignment with mandrel 12 by repeating the simultaneous actuation of push buttons 250, 251. When the doffing device is in the out position, it contacts and closes switch 230 thereby opening switch 255. Thus, when the operator repeats the contact of push buttons 250, 251, solenoil 274 is actuated which reverses valve 158 thereby returning the doffing device to alignment with mandrel 12. When the doffing device is aligned with mandrel 12, it contacts mandrel interlock valve 162, clearing the shirring operation control circuit and assuring that the doffing device is empty of casing and correctly positioned with mandrel 12.

Figure 5:
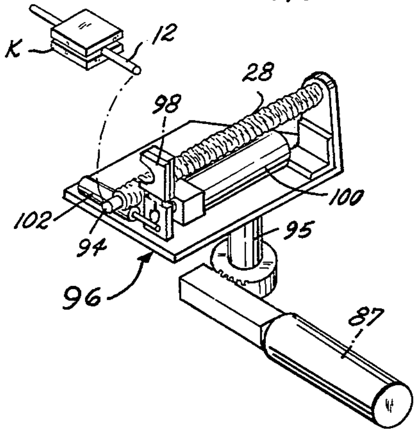
FIGURE 5 is a perspective of the doffing device in a position for removal of finished casing.

Thus, doffing unit 96 functions as a reservoir for finished casing 28, which is prevented from expanding in length by retention surface 98, as shown in FIGURE 5.

The operations described are completely automatic, but are dependent upon the electro-pneumatic interlock system shown in block diagrams on FIGURES 18 and 22.

In the electrical system diagram (FIGURE 18), the power source which for example may be 440 v. A.C., 60 cycle, 3 phase, is used to drive motors 32, 82 and through transformer 278 provides 110 v. A.C. for the three interrelated control circuits schematically shown on FIGURES 19, 20 and 21. The 110 v. A.C. is connected rectifier 262 to provide 90 v. D.C. for actuating solenoid operated motor brakes 280, 282, reel brake 284 and electrically operated clutch 60. The solenoid operated valves shown on the electrical control circuits and also on the pneumatic circuits are actuated by the 110 v. A.C., 60 cycle control circuit.

In the pneumatic system (FIGURE 22), three pressure sources are used to actuate the pneumatic elements. They are supplied by appropriate manifolds. The 80 p.s.i. system provides power to operate the pneumatic cylinders actuating the various clamps, carriages, etc., described in detail in FIGURES 23, 24. The 20 p.s.i. system is used to return compressor arm 90, open clamps "C" and "K" and furnish the momentary mandrel inflation pressure at the start of the shirring cycle. The 8 p.s.i. air system is used to provide the mandrel inflation air during the larger part of the shirring cycle.

In operation at the start of a shirring cycle, as shown in FIGURE 1, casing piece 22 which has previously been shirred and severed from unshirred casing 20, is in loosely shirred condition, and casing piece 26 is in tightly compressed condition between transfer arm 64 and adjacent surface of clamp "K." Mandrel 94 of doffing station 96 is vacant of casing.

In FIGURE 13, the operating components are at 64 percent of the cycle. Casing piece 24 has been firmly compressed between advance surface of holdback arm 30 and adjacent surface of clamp "C." Clamp "K" is opened and a tightly-compressed casing has been transferred through the opened clamp along mandrel 12 by transfer arm 64, from the tightly compressed zone onto doffing mandrel 94 to retain the formed stick 28. Retention surface 98 is shown swinging into engagement with mandrel 94 as transfer arm 64 is being disengaged therefrom.

Arm 64 is then retracted and retention surface 98 is advanced to maintain casing piece 28 under compression.

In FIGURE 14, the operating components are in position at 80 percent of the cycle. Doffing unit 96 is turned about and retention surface 98 is disengaged from mandred 94, thus permitting doffing the finished casing stick 28 therefrom. Transfer arm 64 is retracted and holdback arm 30 is advanced, and each are shown engaging indexing carriage 93. This indexes the two arms into mutual position permitting the transfer gripping surface of arm 64 to fit between the two spaced holdback fork surface 31 and gripping surface 33 on mandrel 12.

In FIGURE 15, the components are at 90 percent of the cycle. Shirring has been completed, clamp "C" is open, and transfer arm 64 is shown pushing casing 24 up to the adjacent surface of clamp "K." Holdback arm 30 has been swung out of engagement with mandrel 12, and retracted to the shirring zone immediately after shirring head S has been retracted from the zone of shirring.

Immediately before completion of the machine cycle, as shown in FIGURE 1, clamp "C" is closed. Casing piece 26 is in position in tightly compressed condition between the transfer arm 64 and adjacent surface of clamp "K." Holdback arm 30 is swung into engagement with mandrel 12. Arm 30 is advanced when shirring head S is advanced to shirring position, and the leading edge 33 of holdback arm 30 engages the terminus of loosely shirred casing 22 thereby tensioning unshirred casing 20 and severing the same from the shirred casing 22.

The machine is arranged to operate continuously, repeating the automatic shirring, severing, compressing, doffing and transfer operations as long as successive shirred casing lengths are repeatedly removed from the terminal doffing station.

If the finished shirred and compressed casing is not removed from the doffing station before the compression cycle of the succeeding piece is terminated, the interlock system hereinbefore described, halts the machine at the end of the shirring cycle. The machine automatically resumes operation as and when the finished compressed shirred casing is removed from the doffing station.

The automatic shirring machine of this invention requires only 30 to 40 percent attendance by an operator, thus permitting one operator to attend several machines, or one machine arranged with several shirring positions.

Method claims originally filed herein have been divided out and reasserted in copending application Serial No. 166,023, filed January 15, 1962.

What is claimed is:

1. Apparatus for the manufacture of shirred casings comprising a shirring head, a shirring mandrel, means for operating said shirring head to shir successive measured lengths of flattened cellulosic tubing on the same shirring mandrel as a first stage of compression, means for applying axial force in the direction away from said shirring head to the trailing end of each successive shirred length to advance it further in the direction away from said shirring head along the same shirring mandrel as a second stage of compression, and means for applying axial force to the trailing end of each successive advanced second stage length to advance it still further in the direction away from said shirring head along the same shirring mandrel as a third stage of compression.

2. Apparatus for the manufacture of shirred casings comprising a mandrel having supply and discharge passages therein and a conical tip, feed rolls in advance of said tip for passing a flattened casing onto said mandrel, and means for inflating said casing and cooperating therewith for lubricating the inside thereof, comprising means for passing lubricated air along said supply passage inside said mandrel, said conical tip having an imperforate point but having orifices spaced around the larger diameter thereof and directed away from said point for discharging said lubricated air into the inside wall of said casing, whereby streams of air from said orifices pass along the conical surface of said tip until the air is trapped by said inside wall of said casing between said feed rolls in advance of the surface of the tip and returned in a larger annular reverse stream to lubricate the inside wall of said casing, said annular reverse stream discharging beyond said tip in the direction of travel through said discharge passage inside said mandrel.

3. In apparatus for the manufacture of shirred casings, an elongated mandrel, a retractable shirring head having a shirring passage through which said mandrel passes, feed rolls for passing a flattened tubing onto said mandrel, means for inflating said tubing and passing the inflated tubing through said shirring head, two pairs of annularly grooved rolls in tandem between the feeding rolls and the shirring passage, and through which pairs said tubing passes from said feeding rolls to said shirring head to provide central spaced passages to align and support the casing span.

4. In apparatus for the manufacture of shirred casings comprising a shirring head, a mandrel, means for passing a measured length of flattened tubing over said mandrel and through said shirring head, means for retracting said shirring head axially rearward from the zone of shirring to expose the terminus of the shirred casing and a length of unshirred tubing rearward thereof, a powered grip member for encircling and gripping the unshirred casing, and means for advancing said powered grip member along the mandrel to stress and part the tubing in said unshirred length thereof.

5. In a casing shirring machine comprising a shirring head, a shirring mandrel, means for maintaining said shirring mandrel at all times in alignment with said shirring head a clamp spaced along said shirring mandrel, a holdback fork engaging said mandrel between said shirring head and said clamp, means for moving said holdback fork away from said shirring head along said shirring mandrel for a predetermined travel short of said clamp to restrict the advance of casing shirred by said head, and gripping jaws carried by said holdback moving means ahead of said holdback fork for compressing a previously shirred casing against said clamp.

6. In a casing shirring machine comprising a shirring head, a shirring mandrel, a clamp spaced along said mandrel, a holdback fork movable along said mandrel away from said shirring head, gripping jaws movable with said holdback fork to compress a shirred casing against said clamp, a transfer arm mounted for movement along said mandrel away from said shirring head, means for inserting said transfer arm between said holdback fork and said gripping jaws into engagement with said mandrel, means for opening said clamp, means for retracting said gripping jaws, and means for moving said transfer arm along said mandrel away from said shirring head for advancing said compressed shirred casing through said opened clamp to a further compression station.

7. In a casing shirring machine comprising a mandrel, a shirring head for shirring a casing on said mandrel, a transfer arm movable into engagement with the trailing end of said shirred casing, means for moving said transfer arm along said shirring mandrel away from said shirring head to advance said shirred casing to a compression station, and booster means engaging said transfer arm and moving it further away from said shirring head along said shirring mandrel at said station for further compressing said shirred casing.

8. In a casing shirring machine comprising a mandrel, a holdback carriage movable parallel to said mandrel for a first travel, a transfer carriage movable parallel to said mandrel for a second travel, a transfer arm longitudinally yieldable on said transfer carriage, and an indexing carriage movable parallel to said mandrel for an intermediate travel, coacting abutments on said holdback and indexing carriages for positioning said indexing carriage, and coating abutments on said indexing carriage and transfer arm for registering said transfer arm with said holdback carriages.

9. In a casing shirring machine comprising a frame, a stationary shirring mandrel rigidly mounted in said frame, a shirring head mounted at one end of said stationary mandrel for shirring a casing on said mandrel, means movable away from said shirring head for compressing the shirred casing on said mandrel, a doffing mandrel pivotally mounted at the other end of said shirring mandrel away from said shirring head to swing from a loading position in alignment with said shirring mandrel to a doffing position transverse thereto, means for pushing the compressed shirred casing off of said shirring mandrel onto said aligned doffing mandrel, and means for swinging said doffing mandrel to doffing position.

10. In apparatus for the manufacture of shirred casings, a frame, a stationary shirring mandrel rigidly mounted in said frame, a holdback engaging said shirring mandrel, means for advancing said holdback along said shirring mandrel away from said shirring head, means for shirring a measured length of flattened cellulosic tubing on said mandrel against said advancing holdback as the first stage of compression, a pusher engaging said shirring mandrel ahead of said holdback, means for advancing said pusher away from said shirring head further along said shirring mandrel for applying axial force to the trailing end of said shirred length to advance it further along the mandrel as a second stage of compression while a subsequent length is undergoing said first stage, a compressor engaging said shirring mandrel ahead of said pusher, and means for advancing said compressor away from said shirring head along a third portion of said shirring mandrel for applying axial force to the trailing end of said advanced second stage length to advance it still further along the same shirring mandrel as a third stage of compression while said second length is undergoing said second stage.

References Cited in the file of this patent

UNITED STATES PATENTS

| | | |
|---|---|---|
| 1,938,070 | Friedler | Dec. 5, 1933 |
| 1,993,480 | Hewitt | Mar. 5, 1935 |
| 2,010,626 | Dietrich | Aug. 6, 1935 |
| 2,583,654 | Korsgaard | Jan. 29, 1952 |
| 2,722,714 | Blizzard et al. | Nov. 8, 1955 |
| 2,722,715 | Blizzard et al. | Nov. 8, 1955 |